(12) United States Patent
Huang (10) Patent No.: US 10,452,725 B2
(45) Date of Patent: Oct. 22, 2019

(54) WEB PAGE RECOGNIZING METHOD AND APPARATUS

(71) Applicant: TENCENT TECHNOLOGY (SHENZHEN) COMPANY LIMITED, Shenzhen, Guangdong (CN)

(72) Inventor: Yu Huang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 655 days.

(21) Appl. No.: 15/202,369

(22) Filed: Jul. 5, 2016

(65) Prior Publication Data

US 2016/0314207 A1 Oct. 27, 2016

Related U.S. Application Data

(63) Continuation of application No. PCT/CN2015/072281, filed on Feb. 5, 2015.

(30) Foreign Application Priority Data

Feb. 10, 2014 (CN) .......................... 2014 1 0046966

(51) Int. Cl.
*G06F 16/951* (2019.01)
*G06F 16/31* (2019.01)
(Continued)

(52) U.S. Cl.
CPC .......... *G06F 16/951* (2019.01); *G06F 16/313* (2019.01); *G06F 16/353* (2019.01); *G06F 16/958* (2019.01)

(58) Field of Classification Search
CPC ..... G06F 16/313; G06F 16/951; G06F 16/958
See application file for complete search history.

(56) References Cited

U.S. PATENT DOCUMENTS

| 2005/0165580 | A1 | 7/2005 | Goodman | |
| 2008/0320010 | A1* | 12/2008 | Li | G06F 16/9535 |
| 2009/0228468 | A1* | 9/2009 | Qin | G06F 16/313 |

FOREIGN PATENT DOCUMENTS

| CN | 1790405 A | 6/2006 |
| CN | 101227435 A | 7/2008 |
| CN | 103377243 A | 10/2013 |

OTHER PUBLICATIONS

Office Action Issued in Chinese Application No. 201410046966.9 dated Nov. 23, 2017.
(Continued)

*Primary Examiner* — Kris E Mackes
(74) *Attorney, Agent, or Firm* — Knobbe Martens Olson & Bear LLP (57) ABSTRACT

Disclosed is a web page recognizing method, which includes obtaining a weight of each segmented word of a web page to be recognized; acquiring, according to the weight of each segmented word of a web page to be recognized, weights of the web page to be recognized in two predetermined web page categories through calculation by using a logistic regression model established in advance; and taking a web page category having a greater weight as a category of the web page to be recognized. Also disclosed is a web page recognizing apparatus. The present disclosure recognizes a web page more accurately, especially for a web page in which key words are difficult to distinguish.

12 Claims, 4 Drawing Sheets

(51) Int. Cl.
    *G06F 16/958*     (2019.01)
    *G06F 16/35*     (2019.01)

(56) References Cited

OTHER PUBLICATIONS

International Search Report for International Application No. PCT/CN2015/072281 dated May 4, 2015 in 2 pages.

Wang, Qingxing et al., "Filtering Chinese Spam Email Using Logistic Regression" Computer Science, vol. 35, No. 10, Oct. 25, 2008 in 5 pages.

Jia, Zhiyang et al. "Content-Bassed Spam Web Page Detection in Search Engine" Computer Applications and Software, vol. 26, No. 11, Nov. 30, 2009 in 4 pages.

Liu, Juxin et al., "Spam Filter Based on Multiple Classifier Combinational Model" Computer Engineering vol. 36, No. 18, dated Sep. 30, 2010 in 3 pages.

International Preliminary Report on Patentability for International Application No. PCT/CN2015/072281 dated Aug. 16, 2016 in 5 pages.

\* cited by examiner

WEB PAGE RECOGNIZING METHOD AND APPARATUS

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

Field

The present disclosure relates to the field of computers, and in particular, to a web page recognizing method and apparatus.

Description of the Related Art

With development of the mobile Internet, people can access the Internet conveniently using mobile terminals, and can acquire various kinds of information. However, among numerous web page categories, some spam web pages such as network fraud and pornography frequently appear, which brings annoyance to users.

A current solution is to establish a key word library reflecting features of spam web pages in advance, and then match words of a web page to be recognized with key words in the key word library. If a quantity of matching words reaches a certain threshold, the web page is recognized as a spam web page.

In the above web page recognizing method, because of diversity of web page content, it is not guaranteed that the key word library contains all key words reflecting features of spam web pages, and some safe web pages containing the key words may be incorrectly judged, so that the effect of recognizing web pages is poor.

SUMMARY

The embodiments of the present disclosure provide a web page recognizing method, which includes: obtaining a weight of each segmented word of a web page to be recognized; acquiring, according to the weight of each segmented word of the web page to be recognized, weights of the web page to be recognized in two predetermined web page categories through calculation by using a logistic regression model established in advance; and taking a web page category having a greater weight as a category of the web page to be recognized.

The embodiments of the present disclosure further provide a web page recognizing apparatus, which includes: a weight obtaining module, configured to obtain a weight of each segmented word of a web page to be recognized; a calculating module, configured to acquire, according to the weight of each segmented word of the web page to be recognized, weights of the web page to be recognized in two predetermined web page categories through calculation by using a logistic regression model established in advance; and a category determining module, configured to take a web page category having a greater weight as a category of the web page to be recognized.

The embodiments of the present disclosure recognize a web page to be recognized by using a logistic regression model established in advance. Because the logistic regression model established in advance is acquired by studying multiple web page samples, compared with key word recognizing methods in the existing technology, the embodiments recognize a web page more accurately, especially for recognizing a web page in which key words are difficult to distinguish.

The implementation, functions, characteristics, and advantages of the present disclosure are further described with reference to the embodiments and the accompanying drawings.

DETAILED DESCRIPTION

The technical solutions of the present disclosure are further described with reference to the accompanying drawings and specific embodiments in the following. It should be understood that, the specific embodiments described here are merely intended to explain the present disclosure, but are not intended to limit the present disclosure.

The present disclosure provides a web page recognizing method. To solve the problem of low efficiency of web page recognizing methods in the existing technology, in the present disclosure, a web page is recognized by using a logistic regression model and a naive Bayesian model established in advance. Compared with the existing technology, the web page recognizing method of the present disclosure recognizes a web page more accurately, and the recognizing efficiency is also higher.

For a better understanding of the present disclosure, firstly, the logistic regression model and the naive Bayesian model established in advance are introduced here.

The logistic regression model is a linear classification model, which can transform a linear function into a probability value between 0 and 1. In this embodiment, the logistic regression model is established by training a batch of samples. The specific process is as follows: (1) label a batch of samples as a sample set, and determine a classification of each web page sample; (2) perform word segmentation processing on each web page sample, and acquire segmented words of each web page sample; in order to segment words accurately, a word library on which the word segmentation processing is based is composed of words extracted from a title and a page navigation of the web page sample; (3) count a term frequency and an inverse document frequency of each of the segmented words in the web page samples, and calculate a weight of each of the segmented words in the web page samples; the term frequency refers to a quantity of a word appearing in a web page; the inverse document frequency is acquired by calculating a document frequency; for example, if a word appears in m documents, a document frequency of the word is m, and the inverse document frequency is acquired through calculation by using a formula log(N/(DF+0.01)), where DF indicates the document frequency, and N indicates a total number of web pages; and (4) study the web samples in the sample set to arrive at a logistic regression model according to the weight of each of the segmented words in the web samples; afterwards, calculate weights of the web page samples in two predetermined web page categories by using the logistic regression model.

The naive Bayesian model is a classification model based on probability distribution, which can be generated according to labeled training samples. The model can be used to calculate a probability of a web page category to which an unknown web page belongs, and further determine the web page category of the unknown web page. In this embodiment, the naive Bayesian model is also established by training a batch of samples, and is based on the weights of the web page samples in two predetermined web page categories obtained by using the logistic regression model established above. The specific process is as follows: (5) obtain web page features of each web page sample such as a web page address and a web page title, and obtain weights of the web page address and the web page title of each web page sample in the two predetermined web page categories; and (6) study web page samples in the sample set to arrive at the naive Bayesian model according to the weights of the web page address and the web page title of each web page sample in the two predetermined web page categories and the weights of the web page samples in the two predetermined web page categories.

Figure 1:
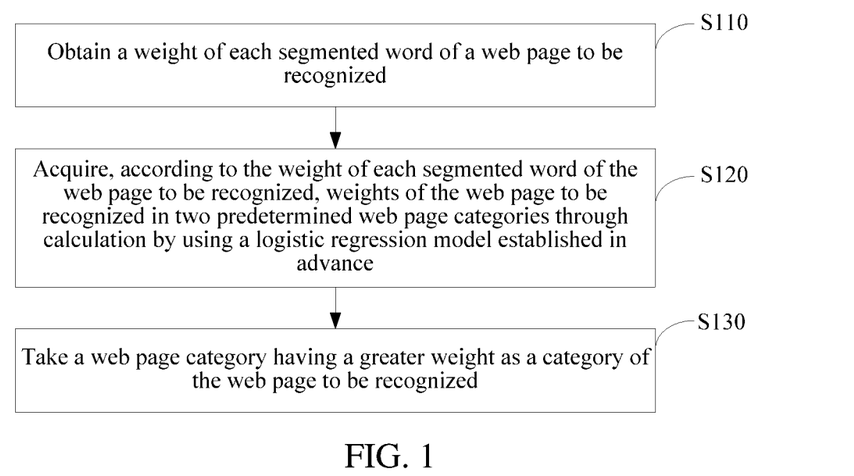
FIG. 1 is a schematic flowchart of an embodiment of a web page recognizing method of the present disclosure.

Referring to FIG. 1, the web page recognizing method includes:

Step S110: Obtain a weight of each segmented word of a web page to be recognized.

After the web page to be recognized is obtained, a proportion of each segmented word in the web page is calculated. The proportion can be calculated according to locations of each segmented word appears in the web page, times of each segmented word appears in the web page, and the like.

Step S120: Acquire, according to the weight of each segmented word of the web page to be recognized, weights of the web page to be recognized in two predetermined web page categories through calculation by using a logistic regression model established in advance.

In this embodiment, the two web page categories are adult type and non-adult type. Certainly, the two web page categories may be other predetermined web page categories. The weights of each segmented word of the web page to be recognized are used as input to the above logistic regression model established in advance, and weights of the web page to be recognized in the two predetermined web page categories are output.

Step S130: Take a web page category having a greater weight as a category of the web page to be recognized.

In this embodiment, the weights of the web page to be recognized in two predetermined web page categories are calculated, and the web page to be recognized is either an adult type web page, or a non-adult type web page. Therefore, the sum of a weight of the web page to be recognized in the adult type and a weight of the web page to be recognized in the non-adult type is 1. Then, the web page category having a greater weight is taken as a category of the web page to be recognized, or the web page category having a weight greater than 0.5 is taken as a category of the web page to be recognized.

Figure 2:
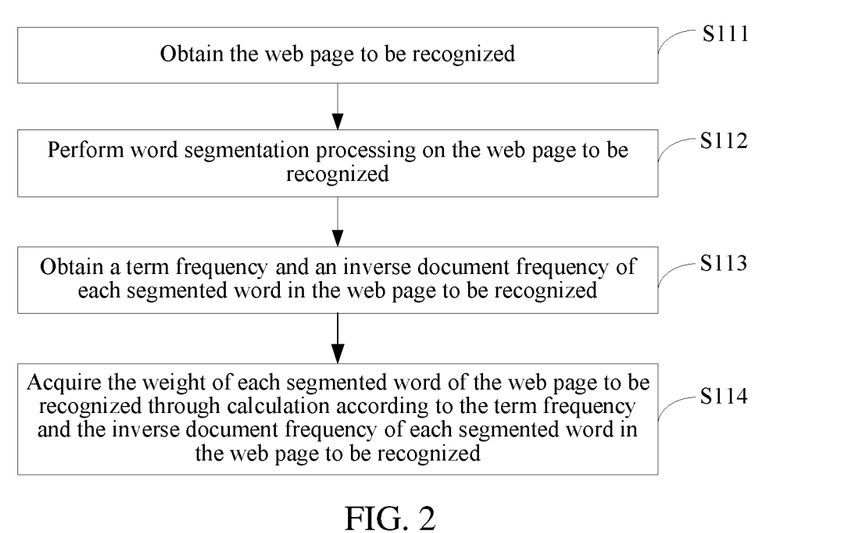
FIG. 2 is a schematic flowchart of specific steps of obtaining the weight of each segmented word of the web page to be recognized in FIG. 1.

Furthermore, referring to FIG. 2, step S110 includes:

Step S111: Obtain the web page to be recognized.

Data of the web page to be recognized can be obtained from a server according to a web page address that a user requests to access.

Step S112: Perform word segmentation processing on the web page to be recognized.

In order to segment words accurately, a word library on which the word segmentation processing of the web page to be recognized is based is composed of universal words extracted from web pages of the two predetermined categories. For example, when the logistic regression model is established, the word library is formed by using words extracted from a title and a page navigation of the web page sample.

Step S113: Obtain a term frequency and an inverse document frequency of each segmented word in the web page to be recognized.

Step S114: Acquire a weight of each segmented word of the web page to be recognized through calculation according to the term frequency and the inverse document frequency of each segmented word in the web page to be recognized.

The term frequency of each segmented word in the web page to be recognized is multiplied by the inverse document frequency of each segmented word in the web page to be recognized, so as to acquire the weight of each segmented word in the web page to be recognized.

The embodiment of the present disclosure recognizes a web page to be recognized by using a logistic regression model established in advance. Because the logistic regression model established in advance is acquired by studying multiple web page samples, compared with key word recognizing methods in the existing technology, this embodiment recognizes a web page more accurately, especially for recognizing a web page in which key words are difficult to distinguish.

Figure 3:
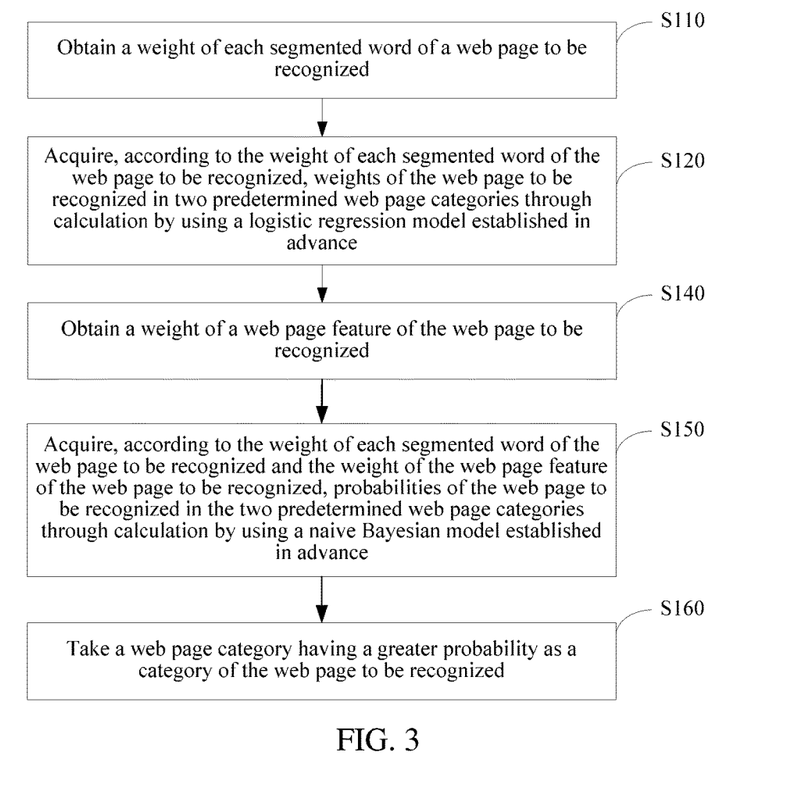
FIG. 3 is schematic flowchart of another embodiment of a web page recognizing method of the present disclosure.

Referring to FIG. 3, in another embodiment of the web page recognizing method of the present disclosure, after step S120 of the above embodiment, the method further includes:

Step S110: Obtain a weight of a web page feature of the web page to be recognized.

Firstly, each page feature of the web page to be recognized is obtained, such as a URL address of the web page and a web page title. Afterwards, the weight of each web page feature in a web page category is determined.

Step S150: Acquire, according to the weight of each segmented word of the web page to be recognized and the weight of the web page feature of the web page to be recognized, probabilities of the web page to be recognized in the two predetermined web page categories through calculation by using a naive Bayesian model established in advance.

Step S160: Take a web page category having a greater weight as a category of the web page to be recognized.

Figure 4:
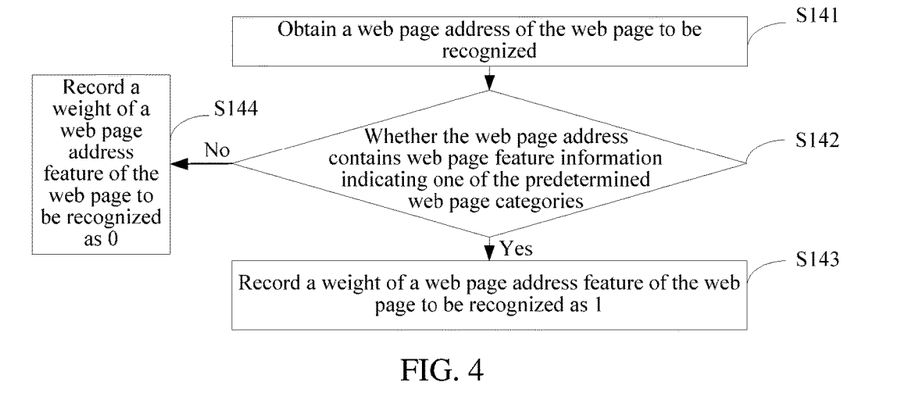
FIG. 4 is a schematic flowchart of an embodiment of obtaining a weight of a web page feature of the web page to be recognized in FIG. 3.

Furthermore, referring to FIG. 4, step S140 includes:

Step S141: Obtain a web page address of the web page to be recognized.

Step S142: Determine whether the web page address contains web page feature information indicating one of the predetermined web page categories; if yes, step S143 is performed; otherwise, step S144 is performed.

Step S143: Record a weight of a web page address feature of the web page to be recognized as 1.

Step S144: Record a weight of a web page address feature of the web page to be recognized as 0.

Figure 5:
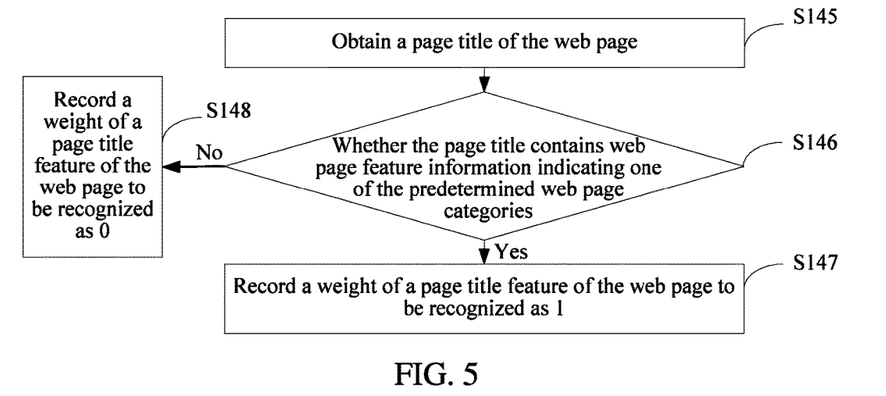
FIG. 5 is a schematic flowchart of another embodiment of obtaining a weight of a web page feature of the web page to be recognized in FIG. 3.

Furthermore, referring to FIG. 5, step S140 includes:

Step S145: Obtain a page title of the web page.

Step S146: Determine whether the page title contains web page feature information indicating one of the predetermined web page categories; if yes, step S147 is performed; otherwise, S148 is performed.

Step S147: Record a weight of a web page title feature of the web page to be recognized as 1.

Step S148: Record a weight of a web page title feature of the web page to be recognized as 0.

The web page feature information indicating one of the predetermined web page categories is a feature corresponding to a web page of the predetermined web page category. For example, when the predetermined web page category is an adult web page category, the web page feature information indicating the web page category is key words corresponding to the adult web page category.

This embodiment recognizes a web page to be recognized by using both the logistic regression model and the naive Bayesian model. Because the naive Bayesian model combines multiple dimensions of features of the web page, this embodiment further improves web page recognizing accuracy.

The web page recognizing method of the present disclosure can be used for recognizing an adult page. When it is recognized that a web page to be accessed by the user contains an adult page, the web page is filtered. A recognizing test is performed on a web page to be recognized by using the logistic regression model (LR model) and the naive Bayesian model (NB model) established in advance in the following. The sample set on which the logistic regression model and naive Bayesian model are based has 2151 web page samples, 980 adult pages, and 1171 non-adult pages. The testing result is shown as the following table:

| Model | Training Sample | Model Accuracy | Adult Category Accuracy Rate | Adult Category Recall Rate |
|---|---|---|---|---|
| LR Model | 2151 samples | 94.521% | 95.56% | 92.24% |
| LR + NB Model | 2151 samples | 96.93% | 97.80% | 95.41% |

It can be known from the above table that, the mixed model based on the LR model and the NB model has a higher accuracy rate and recall rate, which means a better recognizing effect.

Figure 6:
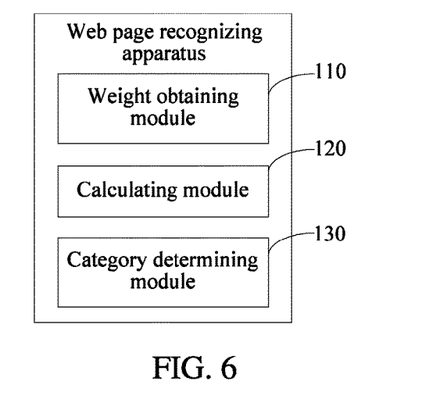
FIG. 6 is a schematic diagram of functional modules of an embodiment of a web page recognizing apparatus of the present disclosure.

Accordingly, referring to FIG. 6, an embodiment of a web page recognizing apparatus of the present disclosure includes: a weight obtaining module 110, configured to obtain a weight of each segmented word of a web page to be recognized; a calculating module 120, configured to acquire, according to the weight of each segmented word of the web page to be recognized, weights of the web page to be recognized in two predetermined web page categories through calculation by using a logistic regression model established in advance; and a category determining module 130, configured to take a web page category having a greater weight as a category of the web page to be recognized.

The embodiment of the present disclosure recognizes a web page to be recognized by using a logistic regression model established in advance. Because the logistic regression model established in advance is acquired through studying multiple web page samples, compared with key word recognizing methods in the existing technology, this embodiment recognizes a web page more accurately, especially for recognizing a web page in which key words are difficult to distinguish.

Figure 7:
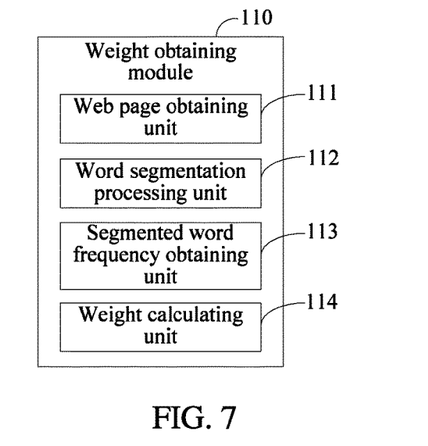
FIG. 7 is a schematic diagram of functional modules of an embodiment of a weight obtaining module in a web page recognizing apparatus of the present disclosure.

Furthermore, referring to FIG. 7, the weight obtaining module 110 includes: a web page obtaining unit 111, configured to obtain the web page to be recognized; a word segmentation processing unit 112, configured to perform word segmentation processing on the web page to be recognized; a segmented word frequency obtaining unit 113, configured to obtain a term frequency and an inverse document frequency of each segmented word in the web page to be recognized; and a weight calculating unit 114, configured to acquire a weight of each segmented word of the web page to be recognized through calculation according to the term frequency and the inverse document frequency of each segmented word in the web page to be recognized.

Furthermore, the weight obtaining module 110 is further configured to: obtain a weight of a web page feature of the web page to be recognized.

The calculating module 120 is further configured to: according to the weight of each segmented word of the web page to be recognized and the weight of the web page feature of the web page to be recognized, acquire weights of the web page to be recognized in the two predetermined web page categories through calculation by using a naive Bayesian model established in advance.

The category determining module 130 is further configured to: take a web page category having a greater weight as a category of the web page to be recognized.

This embodiment recognizes a web page to be recognized by using both the logistic regression model and the naive Bayesian model. Because the naive Bayesian model combines multiple dimensions of features of the web page, this embodiment further improves web page recognizing accuracy.

Figure 8:
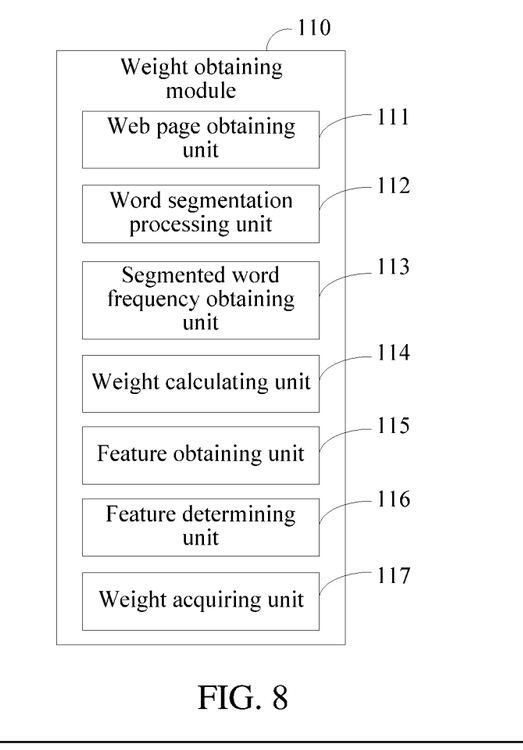
FIG. 8 is a schematic diagram of functional modules of another embodiment of a weight obtaining module in a web page recognizing apparatus of the present disclosure.

Furthermore, referring to FIG. 8, the weight obtaining module 110 further includes: a feature obtaining unit 115, configured to obtain a web page address of the web page to be recognized; a feature determining unit 116, configured to determine whether the web page address contains web page feature information indicating one of the predetermined web page categories; and a weight acquiring unit 117, configured to record a weight of a web page address feature of the web page to be recognized as 1 when the web page address contains the web page feature information indicating one of the predetermined web page categories, or record a weight of a web page address feature of the web page to be recognized as 0 when the web page address does not contain the web page feature information indicating one of the predetermined web page categories.

Furthermore, the feature obtaining unit 115 is configured to obtain a page title of the web page.

The feature determining unit 116 is configured to determine whether the web page title contains web page feature information indicating one of the predetermined web page categories.

The weight acquiring unit 117 is configured to record a weight of a web page title feature of the web page to be recognized as 1 when the page title contains the web page feature information indicating one of the predetermined web page categories, or record a weight of a page title feature of the web page to be recognized as 0 when the page title does not contain the web page feature information indicating one of the predetermined web page categories.

The page feature information indicating one of the predetermined web page categories is a feature corresponding to a web page of the predetermined web page category. For example, when the predetermined web page category is an adult web page category, the web page feature information indicating the web page category is key words corresponding to the adult web page category.

Figure 9:
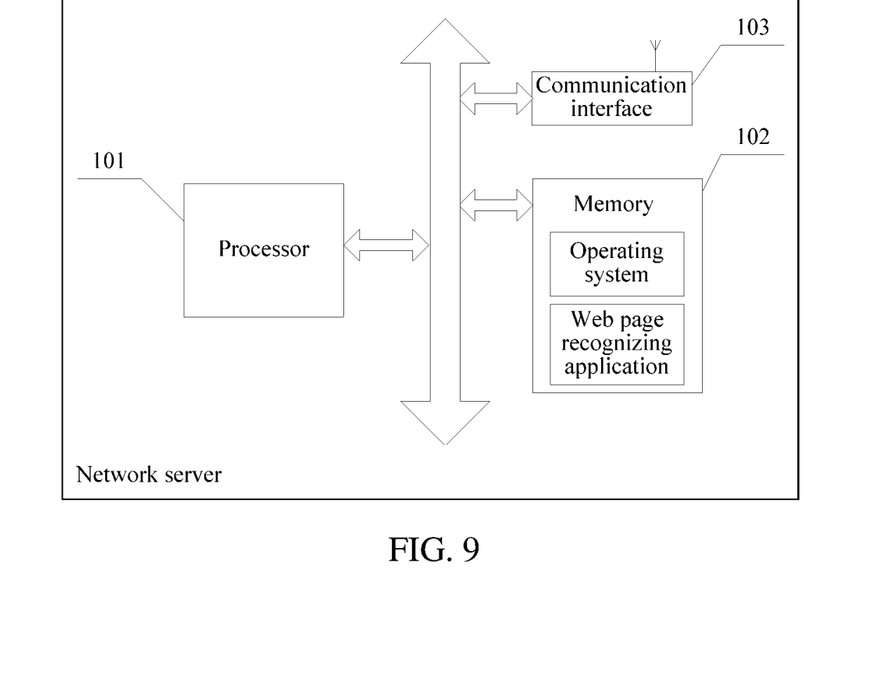
FIG. 9 is a schematic diagram of a hardware architecture of a network server in which a recognizing apparatus of the present disclosure is arranged.

Referring to FIG. 9, the web page recognizing apparatus may be arranged in a background program of a browser client, or in a network server. Take a network server as an example, the network server includes a processor 101, a memory 102, and a communication interface 103. The memory 102 may be configured to store software programs and data, such as a web page recognizing application and data needed for recognizing a web page. The communication interface 103 may be configured to perform communication between the network server and a user terminal. The communication interface may include a wired interface, a WWI interface, and the like. The processor 101 invokes the web page recognizing application and data needed for recognizing a web page from the memory 102, and implements operations of the above web page recognizing method, which is not further described herein.

The foregoing descriptions are merely preferred embodiments of the present disclosure, but are not intended to limit the patent scope of the present disclosure. Any equivalent modifications made to the structures or processes based on the content of the specification and the accompanying drawings of the present disclosure for direct or indirect use in other relevant technical fields shall also fall in the patent protection scope of the present disclosure.

What is claimed is:

1. A web page recognizing method, comprising:
at a network server having one or more processors and memory storing programs executed by the one or more processors;
obtaining a weight of each segmented word of a web page to be recognized;
acquiring, according to the weight of each segmented word of the web page to be recognized, weights of the web page to be recognized in two predetermined web page categories through calculation by using a logistic regression model established in advance; and
taking a web page category having a greater weight as a category of the web page to be recognized;
wherein, after the acquiring weights of the web page to be recognized in two predetermined web page categories through calculation, the method further comprises:
obtaining a weight of a web page feature of the web page to be recognized;
acquiring, according to the weight of each segmented word of the web page to be recognized and the weight of the web page feature of the web page to be recognized, probabilities of the web page to be recognized in the two predetermined web page categories through calculation by using a naive Bayesian model established in advance; and
taking a web page category having a greater probability as a category of the web page to be recognized.

2. The web page recognizing method according to claim 1, wherein the obtaining a weight of each segmented word of a web page to be recognized comprises:
obtaining the web page to be recognized;
performing word segmentation processing on the web page to be recognized;
obtaining a term frequency and an inverse document frequency of each segmented word in the web page to be recognized; and
acquiring the weight of each segmented word of the web page to be recognized through calculation according to the term frequency and the inverse document frequency of each segmented word in the web page to be recognized.

3. The web page recognizing method according to claim 1, wherein the obtaining a weight of a web page feature of the web page to be recognized comprises:
obtaining a web page address of the web page to be recognized;
determining whether the web page address contains web page feature information indicating one of the predetermined web page categories; and
recording a weight of a web page address feature of the web page to be recognized as 1 when the web page address contains the web page feature information indicating one of the predetermined web page categories; or
recording a weight of a web page address feature of the web page to be recognized as 0 when the web page address does not contain the web page feature information indicating one of the predetermined web page categories.

4. The web page recognizing method according to claim 1, wherein the obtaining a weight of a web page feature of the web page to be recognized comprises:
obtaining a page title of the web page;
determining whether the page title contains web page feature information indicating one of the predetermined web page categories; and
recording a weight of a page title feature of the web page to be recognized as 1 when the page title contains the web page feature information indicating one of the predetermined web page categories; or
recording a weight of a page title feature of the web page to be recognized as 0 when the page title does not contain the web page feature information indicating one of the predetermined web page categories.

5. A network server, comprising:
one of more processors;
memory; and
one or more programs modules stored in the memory and configured for execution by the one or more processors, the one or more program modules within a web page recognizing apparatus, including:
a weight obtaining module, configured to obtain a weight of each segmented word of a web page to be recognized;
a calculating module, configured to acquire, according to the weight of each segmented word of the web page to be recognized, weights of the web page to be recognized in two predetermined web page categories through calculation by using a logistic regression model established in advance; and
a category determining module, configured to take a web page category having a greater weight as a category of the web page to be recognized;

wherein the weight obtaining module is further configured to: obtain a weight of a web page feature of the web page to be recognized;

the calculating module is further configured to: acquire, according to the weight of each segmented word of the web page to be recognized and the weight of the web page feature of the web page to be recognized, probabilities of the web page to be recognized in the two predetermined web page categories through calculation by using a naive Bayesian model established in advance; and the category determining module is further configured to: take a web page category having a greater probability as a category of the web page to be recognized.

6. The web page recognizing apparatus according to claim 5, wherein the weight obtaining module comprises:

a web page obtaining unit, configured to obtain the web page to be recognized;

a word segmentation processing unit, configured to perform word segmentation processing on the web page to be recognized;

a segmented word frequency obtaining unit, configured to obtain a term frequency and an inverse document frequency of each segmented word in the web page to be recognized; and a weight calculating unit, configured to acquire the weight of each segmented word of the web page to be recognized through calculation according to the term frequency and the inverse document frequency of each segmented word in the web page to be recognized.

7. The web page recognizing apparatus according to claim 5, wherein the weight obtaining module further comprises:

a feature obtaining unit, configured to obtain a web page address of the web page to be recognized;

a feature determining unit, configured to determine whether the web page address contains web page feature information indicating one of the predetermined web page categories; and a weight acquiring unit, configured to record a weight of a web page address feature of the web page to be recognized as 1 when the web page address contains the web page feature information indicating one of the predetermined web page categories; or record a weight of a web page address feature of the web page to be recognized as 0 when the web page address does not contain the web page feature information indicating one of the predetermined web page categories.

8. The web page recognizing apparatus according to claim 5, wherein the weight obtaining module further comprises:

a feature obtaining unit, configured to obtain a page title of the web page;

a feature determining unit, configured to determine whether the page title contains the web page feature information indicating one of the predetermined web page categories; and a weight acquiring unit, configured to record a weight of a page title feature of the web page to be recognized as 1 when the page title contains web page feature information indicating one of the predetermined web page categories; or record a weight of a page title feature of the web page to be recognized as 0 when the page title does not contain the web page feature information indicating one of the predetermined web page categories.

9. A non-transitory computer readable storage medium having stored therein one or more instructions, which, when executed by a network server, cause the network server to perform operations comprising:

obtaining a weight of each segmented word of a web page to be recognized;

acquiring, according to the weight of each segmented word of the web page to be recognized, weights of the web page to be recognized in two predetermined web page categories through calculation by using a logistic regression model established in advance; and taking a web page category having a greater weight as a category of the web page to be recognized;

wherein, after the acquiring weights of the web page to be recognized in two predetermined web page categories through calculation, the operations further comprise:

obtaining a weight of a web page feature of the web page to be recognized;

acquiring, according to the weight of each segmented word of the web page to be recognized and the weight of the web page feature of the web page to be recognized, probabilities of the web page to be recognized in the two predetermined web page categories through calculation by using a naive Bayesian model established in advance; and taking a web page category having a greater probability as a category of the web page to be recognized.

10. The computer readable storage medium according to claim 9, wherein the obtaining a weight of each segmented word of a web page to be recognized comprises:

obtaining the web page to be recognized;

performing word segmentation processing on the web page to be recognized;

obtaining a term frequency and an inverse document frequency of each segmented word in the web page to be recognized; and acquiring the weight of each segmented word of the web page to be recognized through calculation according to the term frequency and the inverse document frequency of each segmented word in the web page to be recognized.

11. The computer readable storage medium according to claim 9, wherein the obtaining a weight of a web page feature of the web page to be recognized comprises:

obtaining a web page address of the web page to be recognized;

determining whether the web page address contains web page feature information indicating one of the predetermined web page categories; and recording a weight of a web page address feature of the web page to be recognized as 1 when the web page address contains the web page feature information indicating one of the predetermined web page categories; or recording a weight of a web page address feature of the web page to be recognized as 0 when the web page address does not contain the web page feature information indicating one of the predetermined web page categories.

12. The computer readable storage medium according to claim 9, wherein the obtaining a weight of a web page feature of the web page to be recognized comprises:

obtaining a page title of the web page;

determining whether the page title contains web page feature information indicating one of the predetermined web page categories; and recording a weight of a page title feature of the web page to be recognized as 1 when the page title contains the web page feature information indicating one of the predetermined web page categories; or recording a weight of a page title feature of the web page to be recognized as 0 when the page title does not contain the web page feature information indicating one of the predetermined web page categories.

\* \* \* \* \*

UNITED STATES PATENT AND TRADEMARK OFFICE
CERTIFICATE OF CORRECTION

PATENT NO. : 10,452,725 B2
APPLICATION NO. : 15/202369
DATED : October 22, 2019
INVENTOR(S) : Yu Huang It is certified that error appears in the above-identified patent and that said Letters Patent is hereby corrected as shown below:

On the Title Page

Page 2, Column 1, item (56), Line 6, delete "Content-Bassed" and insert --Content-Based--.

In the Specification

Column 7, Line 25, delete "WWI" and insert --WIFI--.

Signed and Sealed this
Seventeenth Day of March, 2020

Andrei Iancu
*Director of the United States Patent and Trademark Office*